United States Patent
Wölcken et al.

(10) Patent No.: US 8,779,943 B2
(45) Date of Patent: Jul. 15, 2014

(54) METHOD OF AND APPARATUS FOR MONITORING THE CONDITION OF STRUCTURAL COMPONENTS

(75) Inventors: Piet Wölcken, Bremen (DE); Wolfgang Entelmann, Lilienthal (DE); Clemens Böckenheimer, Bremen (DE); Holger Speckmann, Schwanewede (DE)

(73) Assignee: Airbus Operations GmbH, Hamburg (DE)

(*) Notice: Subject to any disclaimer, the term of this patent is extended or adjusted under 35 U.S.C. 154(b) by 773 days.

(21) Appl. No.: 12/307,044

(22) PCT Filed: May 9, 2007

(86) PCT No.: PCT/EP2007/054480
§ 371 (c)(1),
(2), (4) Date: Mar. 3, 2009

(87) PCT Pub. No.: WO2008/003546
PCT Pub. Date: Jan. 10, 2008

(65) Prior Publication Data
US 2009/0309762 A1    Dec. 17, 2009

(30) Foreign Application Priority Data
Jul. 5, 2006  (DE) .................. 10 2006 031 009

(51) Int. Cl.
*G08B 21/00*    (2006.01)
(52) U.S. Cl.
USPC ......... 340/945; 701/29.1; 356/35.5; 382/152; 73/760
(58) Field of Classification Search
USPC ............. 701/29, 30, 34, 29.1, 30.1; 356/35.5; 382/152, 149, 181, 276; 73/760; 340/945
See application file for complete search history.

(56) References Cited

U.S. PATENT DOCUMENTS

| 4,816,828 A | 3/1989 | Feher ...................... 340/945 |
| 5,257,088 A * | 10/1993 | Tyson et al. ................. 356/520 |

(Continued)

FOREIGN PATENT DOCUMENTS

| DE | 19925462 | 2/2001 | ............ G01B 11/25 |
| DE | 69916237 | 7/2005 | ............ G01B 21/20 |

(Continued)

OTHER PUBLICATIONS

European Patent Office, European Communication pursuant to Article 94(3) EPC—Appl. No. 07 728 932.1-1524, dated Feb. 18, 2010 (4 pages).

(Continued)

*Primary Examiner* — George Bugg
*Assistant Examiner* — Edny Labbees
(74) *Attorney, Agent, or Firm* — Ingrassia Fisher & Lorenz P.C.

(57) ABSTRACT

The present invention relates to a method of monitoring the condition of structural components, in which an optical sensor in conjunction with a computing unit ascertains image deviations from successive images of the structural components to be monitored, and therefrom ascertains changes in shape of the structure. Robust three-dimensional scanning of the structural components is possible when using two or more sensors. The invention further relates to an apparatus for monitoring the condition of structural components having an optical sensor and an apparatus having two or more sensors. Finally the invention relates to an aircraft in which the methods or apparatuses according to the invention are used.

8 Claims, 5 Drawing Sheets

(56) References Cited

U.S. PATENT DOCUMENTS

Figure 1:
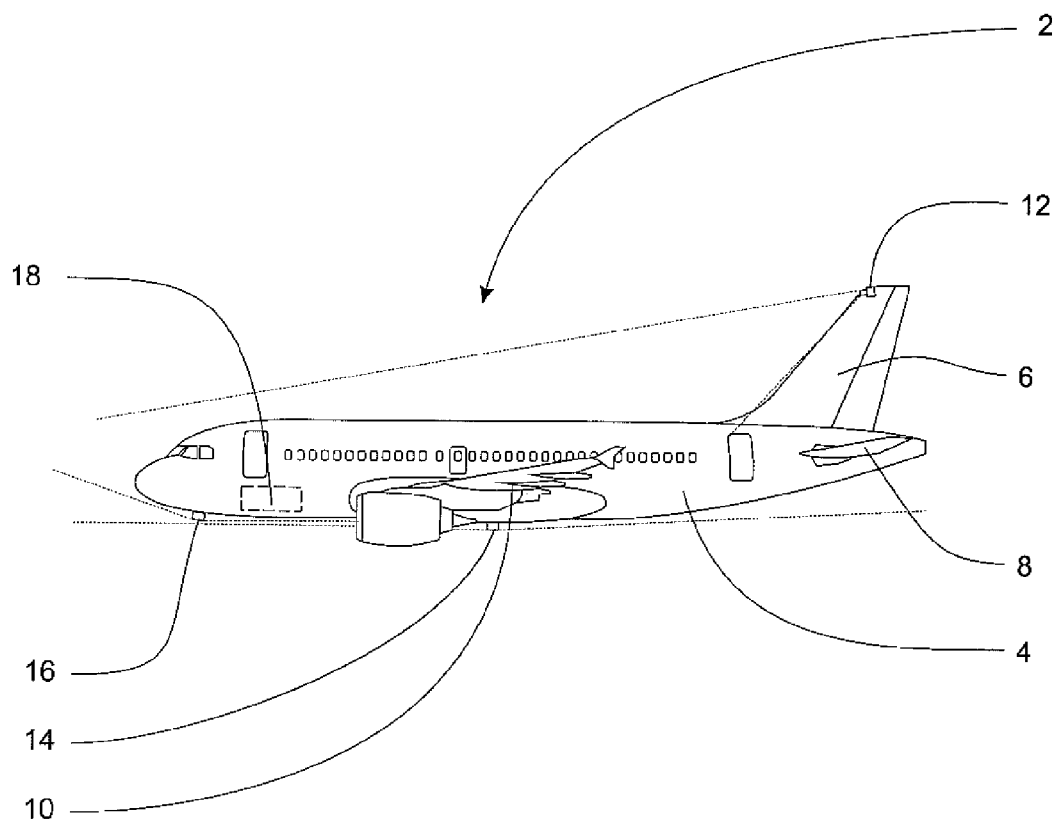

| | | | |
|---|---|---|---|
| 5,257,688 A * | 11/1993 | Fridlund | 198/443 |
| 5,483,604 A * | 1/1996 | Salisbury | 382/152 |
| 6,014,608 A * | 1/2000 | Seo | 701/468 |
| 7,520,666 B2 * | 4/2009 | Pevzner et al. | 374/5 |
| 2004/0051035 A1 * | 3/2004 | Zombo et al. | 250/252.1 |
| 2004/0119869 A1 * | 6/2004 | Tretter et al. | 348/335 |
| 2005/0238237 A1 | 10/2005 | Haeusler et al. | 382/203 |
| 2005/0241403 A1 * | 11/2005 | Thomson et al. | 73/773 |

FOREIGN PATENT DOCUMENTS

| | | | | |
|---|---|---|---|---|
| DE | 102004020419 | | 10/2005 | G01B 11/24 |
| EP | 0 980 828 | | 2/2000 | B64F 1/00 |
| FR | 2838710 | A1 | 10/2003 | B64D 17/08 |
| GB | 2398771 | A * | 9/2004 | |
| JP | 2002/240798 | | 8/2002 | B64D 47/08 |
| RU | 2 171 487 | | 7/2001 | G02B 27/22 |
| SU | 16089 | | 7/1930 | G03B 35/06 |
| WO | WO 93/01977 | | 2/1993 | B64D 45/00 |
| WO | WO 96/39644 | | 12/1996 | G02B 27/22 |
| WO | WO 01/03437 | A1 | 1/2001 | H04N 7/18 |

OTHER PUBLICATIONS

*Patent Abstracts of Japan,* European Patent Office, 1 page—JP 2002/240798 (Takashi Matsuyama, The Nippon Signal Co. Ltd., Aug. 28, 2002).

Authorized Officer E. Navas Montero, *The International Search Report and the Written Opinion of the International Searching Authority,* International Application No. PCT/EP2007/54480, International Searching Authority, Sep. 6, 2007, 12 pages.

Federal Institute of Industrial Property (Russian Federation), Russian Official Action—Application No. 2009103758/11, dated Sep. 16, 2011 (8 pages).

Federal Institute of Industrial Property (Russian Federation), *English Translation* of Russian Official Action—Application No. 2009103758/11, dated Sep. 16, 2011 (4 pages).

\* cited by examiner

METHOD OF AND APPARATUS FOR MONITORING THE CONDITION OF STRUCTURAL COMPONENTS

The present invention relates to a method of and an apparatus for monitoring the condition of structural components with at least one structural condition sensor.

Structures, which as a matter of routine are heavily loaded, of complex pieces of equipment which must afford a very high level of operational safety such as for example aircraft and in particular passenger aircraft must be inspected at given intervals in terms of their intactness or their mechanical condition. That is usually effected after a predetermined number of load cycles (for example take-offs and landings of an aircraft) or after a predetermined period of time. For that purpose, continuing with the example of a passenger aircraft, the aircraft is inspected by means of non-destructive methods for damage to its structure, for example cracks or delamination phenomena. That inspection is complicated and expensive and time-intensive and in addition requires the aircraft to stay on the ground for a prolonged time, which is generally uneconomical.

At the present time, particularly in relation to military aircraft, there are various further methods of being able to detect damage in structural components. Integrating sensors on the structural components to be monitored makes it possible for the condition of the structural components to be already determined during regular flying operations. Such sensors operate locally, that is to say they can only monitor the structure which directly adjoins them. That kind of sensors which includes for example strain gauges, fibre Bragg gratings, tearing wires, vacuum sensors, optical fibres or piezo-based systems are already successfully used in structural condition monitoring systems (also referred to hereinafter as "structural health monitoring" or SMH systems) and have been intensively researched and developed.

The monitoring of large-area structural components, when using locally operative SMH sensors, requires integration thereof over a large surface area, a respective adequate electrical connection and suitable measurement value-detecting devices. Depending on the size of the respective structural component to be monitored that results in immense complication and corresponding costs.

Therefore the object of the invention is to reduce or entirely eliminate the stated disadvantage. In particular an object of the invention is to monitor a structural component with a single structural condition sensor or a few structural condition sensors over as large an area as possible, effectively and inexpensively, and in that respect to keep down the complexity of the structural condition monitoring system. A further object of the invention is to provide a method of and an apparatus for monitoring the condition of a structural component, and an aircraft, in particular a passenger aircraft, in which structural condition monitoring which is as inexpensive and effective as possible takes place and with which at the same time a low level of complexity for the structural condition monitoring system is achieved.

That object is attained by a method of monitoring the condition of a structural component of an aircraft, which comprises the following method steps: producing an image of the structural component with an optical sensor, transmitting the image to at least one computing unit, ascertaining image deviations from the comparison of the image with at least one reference image by the at least one computing unit, ascertaining geometry deviations of discrete regions of the structural component from the image deviations by the at least one computing unit, and ascertaining changes in shape of the structural component from the geometry deviations by the at least one computing unit.

An essential advantage with the method according to the invention is contactless analysing or mapping of the structural component to be monitored by an optical imaging process. The use of a sensor at a suitable location makes it possible to produce an image of the structure to be monitored, which is communicated to one or more computing units. On the basis of reference images which are already present in the computing unit, it is possible to ascertain image deviations in respect of the currently recorded image. Those image deviations can be caused for example by changes in structure because of a bird strike, detached or cracked components and the like. The image deviations as well as exact images of a reference structure are therefore suitable for ascertaining geometry deviations of discrete regions of the structural component. Finally, with the presence of a reference geometry data set, by taking account of the geometry deviations of discrete regions of the structural component, it is possible for elastic and plastic changes in shape of the entire structural component to be ascertained from the geometry deviations, by operation of at least one computing unit. Those changes in shape are described for example in the form of three-dimensional geometry data.

By means of the changes in shape ascertained in that way in respect of the structural components to be monitored, it is easily possible to register, quantify and classify damage. That is possible without using locally operative sensors which are restricted to small regions by volume. The method according to the invention affords a possible way of rapidly and effectively detecting damage, embracing a large area, and providing for structural monitoring.

It is advantageous if the optical sensor is in the form of a camera. Cameras and in particular digital cameras are inexpensively available in many different design configurations, they are widely developed and they digitally provide image data produced, at high speed.

In a particular embodiment of the invention the field of view of the optical sensor is enlarged or deflected by a pivotal mirror and/or an objective arrangement. That permits adaptation of the method according to the invention to surfaces to be monitored, which are of a complicatedly curved configuration, without additional further optical sensors.

It is further advantageous if the optical sensor operates in the non-visible wavelength range. Mapping of the surface, unlike the situation with wavelengths in the visible range, is also possible even under adverse light conditions. The method enjoys increased robustness as a result. In addition ideal adaptation to the conditions, defects and effects to be expected is possible.

The object is also attained by a method of monitoring the condition of a structural component of an aircraft, which comprises the following method steps: producing images of the structural component with two or more mutually spaced optical sensors, communicating the images to at least one computing unit, ascertaining the geometry data of the monitored region of the structural component from the images, and ascertaining geometry deviations of discrete regions of the structural component from the comparison of the ascertained geometry data with a reference geometry data set.

The use of two or more optical sensors which are spaced from each other results in the capability of detecting and processing three-dimensional images. If two mutually spaced sensors are oriented onto a region of a structural component, that region is detected from two different angles of view. The images produced by the sensors make it possible, similarly to the situation with stereoscopic photography, to obtain depth information in respect of the imaged region. The images are passed from the optical sensors to at least one computing unit in which geometry data are ascertained from that three-dimensional image. Finally, by comparison of the ascertained geometry data with a reference geometry data set it is possible to ascertain geometry deviations in respect of the monitored structural component regions in order to be able to ascertain therefrom damage to a structural component.

Similarly to the implementation with the foregoing method it is also possible for structural defects to be quantified and classified with detected geometry deviations of discrete regions.

It is particularly advantageous for the optical sensors to be in the form of cameras, for the reasons set forth hereinbefore. In additional advantageous embodiments the fields of view of the optical sensors are enlarged or deflected by at least one pivotable mirror and/or an objective unit and the optical sensors can preferably operate in the non-visible wavelength range.

The object is further attained by an apparatus for monitoring the condition of a structural component of an aircraft, comprising an optical sensor for producing an image of the structural component and at least one computing unit, wherein the computing unit is adapted to receive the image, to ascertain image deviations from the comparison of the image with at least one reference image, to ascertain geometry deviations of discrete regions of the structural component from the image deviations and to ascertain changes in shape of the structural component from the geometry deviations.

The object of the invention is additionally attained by an apparatus for monitoring the condition of structural components of an aircraft comprising two or more optical sensors for producing an image of the structural component and at least one computing unit, wherein the computing unit is adapted to receive the images, to ascertain geometry data from the images produced, to ascertain geometry deviations of discrete regions of the structural component from the comparison of the ascertained geometry data with a reference geometry data set and to ascertain changes in shape of the structural component from the geometry deviations.

Finally the object is attained by an aircraft, in particular a passenger aircraft, having an apparatus for monitoring the condition of structural components of the aircraft.

Figure 2:
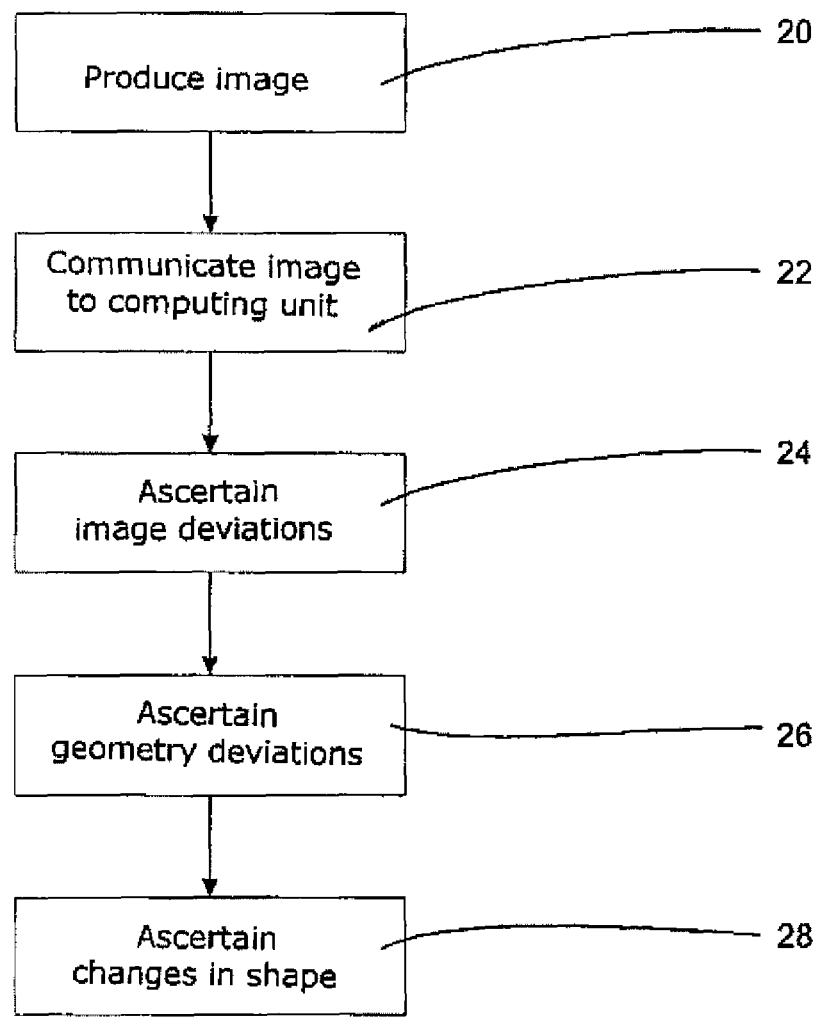
Figure 3:
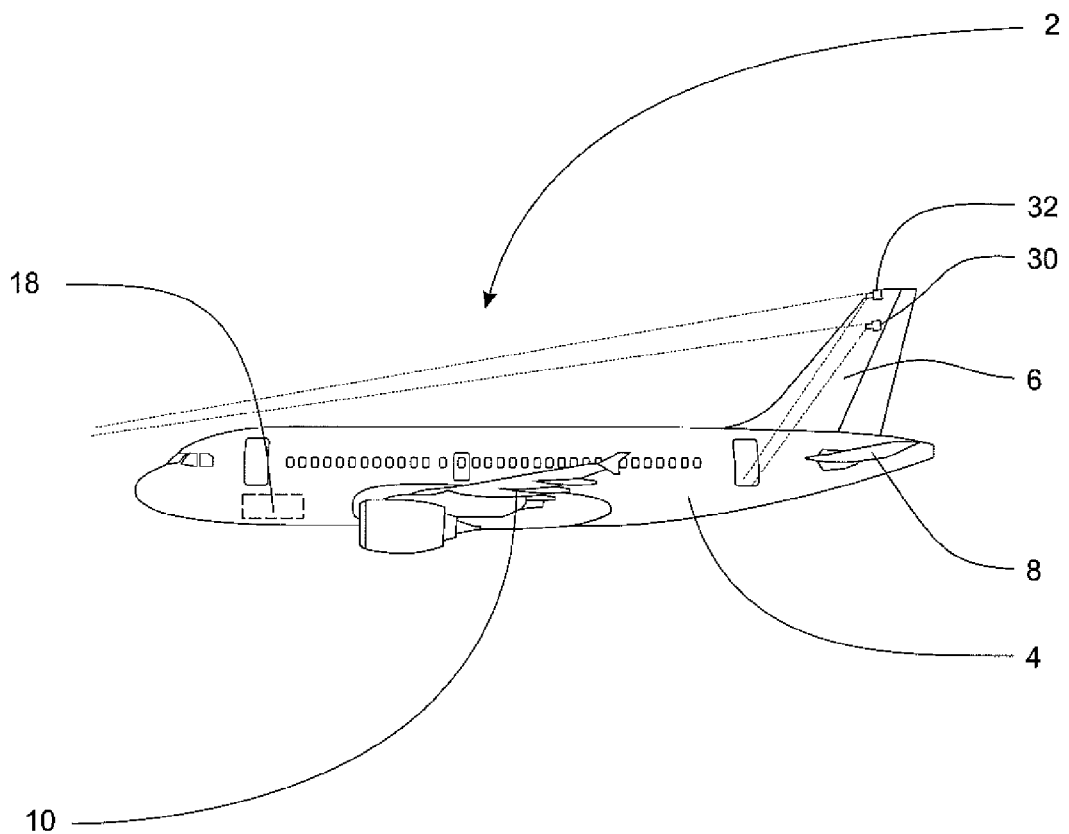
Figure 4:
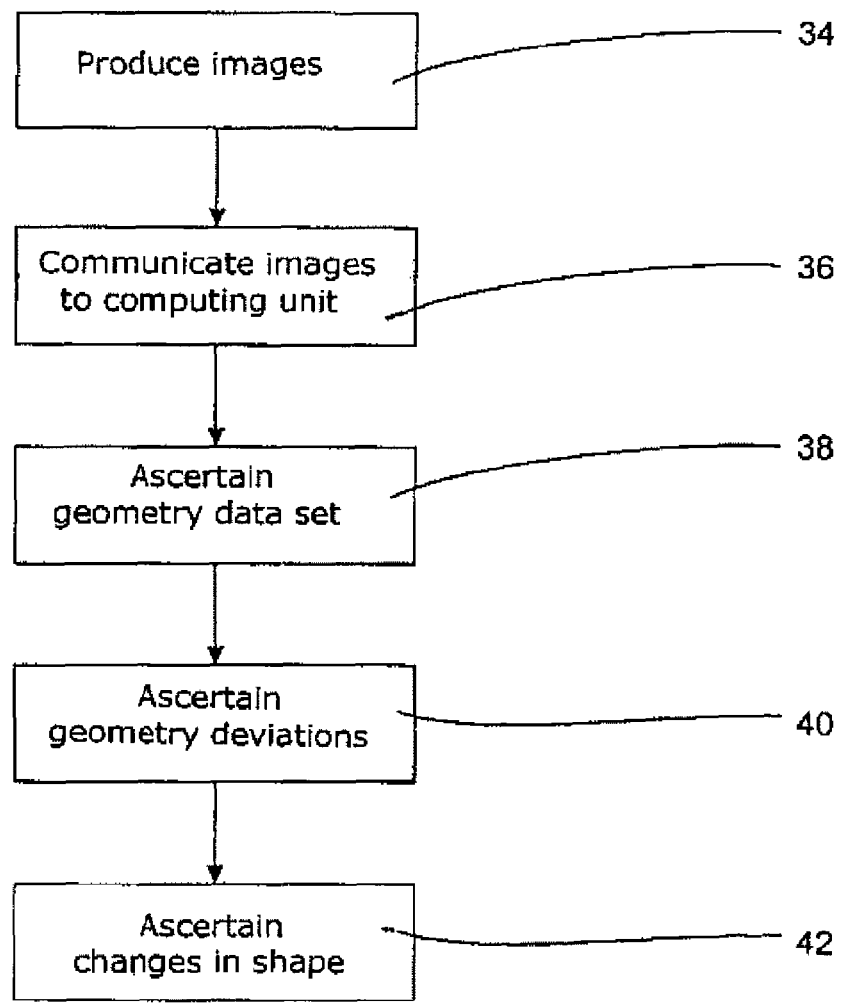
Figure 5:
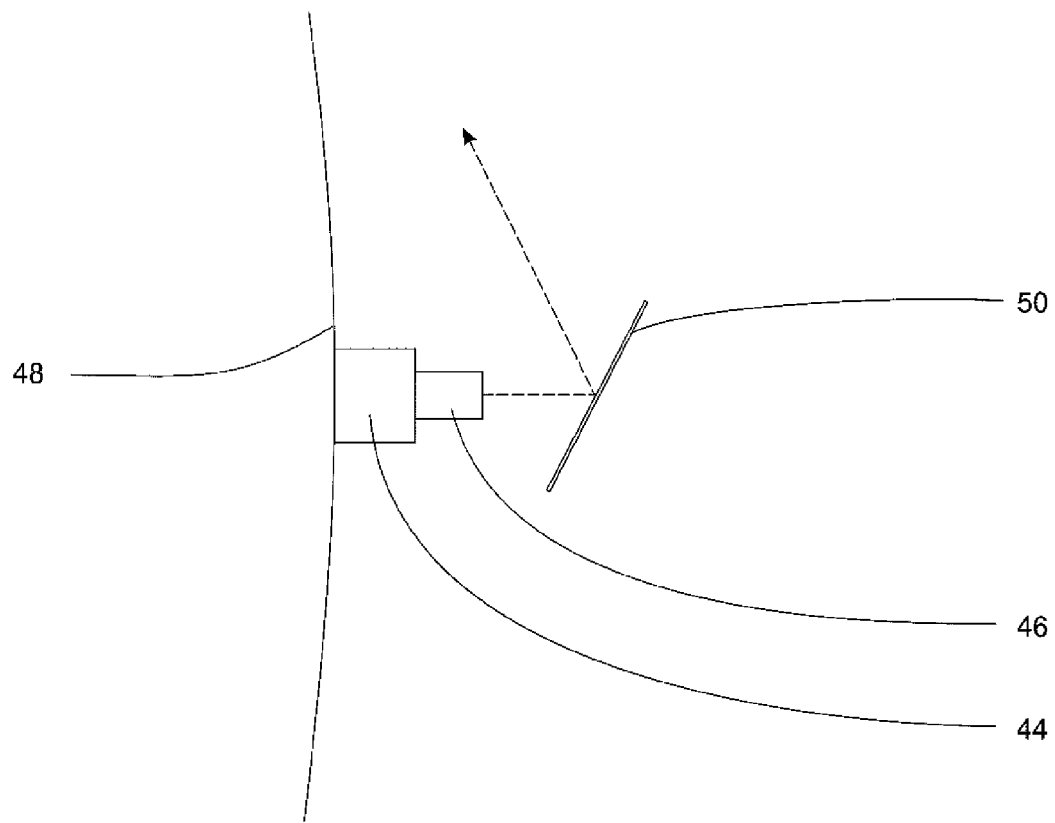

The invention is described in greater detail hereinafter by reference to embodiments by way of example. The same references are used in the specific description for the same or similar elements. In the drawing:

FIG. 1 shows a side view of a first embodiment by reference to a passenger aircraft, FIG. 2 shows a block diagram illustrating the method according to the invention with an optical sensor, FIG. 3 shows a side view of a second embodiment by reference to a passenger aircraft, FIG. 4 shows the method according to the invention with two or more optical sensors, and FIG. 5 is a diagrammatic view illustrating a third embodiment.

FIG. 1 shows a passenger aircraft 2 comprising a fuselage 4, a rudder unit 6, elevators 8 and wings 10. For the purposes of monitoring the aircraft structure in accordance with the method of the invention it is necessary to monitor the structural components by one or more optical sensors.

In FIG. 1 by way of example an optical sensor 12 is arranged at the top side of the leading edge of the rudder unit 6 and is capable of optically detecting the major part of the top side of the aircraft 2. Some smaller regions are not visible to the optical sensor 12 due to the design arrangement of the rudder unit 6. However the entire top side of the fuselage in front of the rudder unit 6 in the direction of flight is in the range of vision of the optical sensor.

The sensor 12 which is advantageously in the form of an imaging sensor such as for example a camera or the like can be caused at predetermined regular intervals or under the control of a signal supplied from the exterior to produce an instantaneous image of the structure to be monitored. That structure image produced does not necessarily have to be a photograph with the representation of the wavelength range which is visible to a human being, it is also possible to envisage infrared recordings and recordings in other wavelength ranges.

In order to detect the structure of the aircraft 2 as completely as possible further sensors can be mounted at further locations of the fuselage 4, the rudder unit 6, the wings 10 and the undercarriage. Thus for example in FIG. 1 a further sensor 14 is arranged at the fuselage-wing transition and a further sensor 16 is arranged in the proximity of the cockpit on the aircraft. All sensor positions can be envisaged, which permit as comprehensive monitoring of the structure as possible, with the lowest possible implementation and expense in terms of sensors.

FIG. 2 serves to depict the method according to the invention which begins with the production of an image by the sensor 12. The representation in FIG. 2 relates to a sequence of method steps for ascertaining an instantaneous structural change in a region being monitored. That sequence of method steps should be implemented repeatedly as continuously as possible to provide for continuous monitoring of a structural condition.

After having been produced by the sensor 12 that image is communicated to a computing unit 18 as indicated at 22. The image is advantageously represented by digital data which are passed to the computing unit 18 from the sensor 12 through a data line.

The computing unit 18 stores a series of reference images of the region being monitored, which in addition to the direction of view of the sensor 12 were also recorded from other directions. Items of three-dimensional information in respect of the region being monitored can be obtained from the combination of the various perspectives, for calibration of the single sensor 12. It is not possible for an object to be stereoscopically imaged with a single optical sensor and the missing information about the three-dimensional depth of the region to be monitored can only be provided by the reference images.

From the change in the successive images from the direction of view of the optical sensor 12, it is possible, by means of the available reference images from other perspectives, to arrive at conclusions about the three-dimensional extent of a structural change. That is effected by the following method steps, beginning with the step of ascertaining image deviations from the comparison 24 of the image of the sensor 12 with at least one reference image, in this case the preceding image of the region to be monitored. The step of ascertaining image deviations by means of the computing unit 18 can be performed by current image comparison procedures which in particular are known from media technology, computer-aided graphic image processing and the like. Those procedures apply for example the principle of colour subtraction.

Geometry deviations of discrete regions of the structural component can be ascertained from the ascertained image deviations by means of the reference images recorded from various perspectives, which as described hereinbefore make three-dimensional depth information available. Those geometry deviations are to be interpreted for example as the translation of given surface points of the structure. Thus a given point on the surface of the structure to be monitored can move in space between the successive recordings of the images of the structure to be monitored. That movement can be quantified after comparison of the successive images.

Finally the step of ascertaining changes in shape of the structural component 28 can be effected from the ascertained geometry deviations. The individual translatory movements of discrete points on the structural component to be monitored only allow conclusions about an instantaneous movement. The displacements must therefore be suitably added to the positions of points in a complete geometry data set, present in the computing unit, in respect of the structure to be monitored. As a result the change in shape is described in such a way that it can be represented in relation to the original starting shape. A geometry data set can be a CAD model of the structure to be monitored, in which individual discrete points are displaceable by the distance which the points to be displaced actually cover between two successive images.

The degree of the change in the instantaneous shape of the structure to be monitored as well as classification of the ascertained change in shape in relation to the original starting shape is a measurement in terms of the severity of damage to or stresses on the structure. The classification involves for example division into expected deflections of wings, non-tolerable buckling or denting and the like. Further measures are triggered in dependence on the severity of the damage. Thus data about severe changes in shape can be stored at a suitable location and can lead at the same time to an alarm being given for the pilots. The further process after a change in shape has been detected can be adapted in accordance with specific requirements having regard to usual condition monitoring methods.

A modification to the method described hereinbefore will now be described with reference to FIGS. 3 and 4. Instead of a single sensor 12 by way of example two sensors 30 and 32 which are spaced from each other and arranged one above the other are now disposed in FIG. 3 at the leading edge of the rudder unit 6. The two sensors 30 and 32 are so directed that they embrace the same region of the structure. Similarly to the situation with a pair of eyes, those two sensors 30 and 32 in combination are capable of producing two images of a single object, with the images differing from each other only in terms of the viewing angle. On the basis of the deviations of the two images from each other it is possible to obtain three-dimensional depth information from the recorded images.

The method according to the invention as shown in FIG. 4 is adapted to the use of two adjacent, mutually spaced optical sensors 30 and 32. Firstly images are produced at 34 by the sensors 30 and 32, which are then communicated to the computing unit 18 as indicated at 36.

Three-dimensional geometry data can be obtained from the two images which by superpositioning provide a three-dimensional image of the structure to be monitored.

Conversion is effected by incremental scanning of the three-dimensional image and generating points or a point cloud of a three-dimensional model, wherein the model is in the form of a wire mesh model or the like.

The change in shape of the structure being monitored is calculated from the comparison of the ascertained geometry data with a reference geometry data set. Position deviations of mesh node points between the ascertained model and the reference model are interpreted as a change in shape or a deviation in shape.

The method of monitoring a structural component by means of two mutually spaced sensors is extremely robust in relation to interference and disruptions, imprecisely recorded reference images or the like, which leads to the three-dimensional geometry being ascertained with any desired degree of accuracy. The complication and expenditure in terms of calibrating the sensors 30 and 32 is reduced in comparison with the use of a single sensor and the translation of structural locations in the sensor direction can be better recognised.

That method can be further improved by the sensors being continuously directed onto various and smaller sub-regions of the structure to be monitored, in order to produce there images which are of high resolution and as sharp as possible and which lead to an increased level of measuring accuracy. That can be achieved by the cameras being arranged pivotably or by fixed cameras being able to enlarge their viewing angle by means of drivable deflection mirrors. FIG. 5 diagrammatically shows such a system. A camera 44 with an objective 46 is fixedly arranged on a structure 48 and is viewing in the direction of a mirror 50, wherein the mirror 50 can be driven pivotably about one or more axes.

The combination of objective size and spacing of the two cameras 44, 30 and 32 respectively can be selected in dependence on the required size of the surface to be monitored as well as the desired level of accuracy. If only a small surface is being monitored, the use of a large-volume objective lens 46 is appropriate, and the cameras 44 should be arranged at a small spacing relative to each other. If two cameras 44 are adapted in that way and in turn each look onto a respective mirror 50, continuous scanning of the entire structure surface to be investigated is possible. In that case the mirrors 50 are pivoted in parallel relationship in accordance with a predetermined pattern. In each mirror position, a very high level of recording accuracy in respect of the images produced and thus a very good degree of measuring accuracy is achieved. When dealing with a large surface to be monitored smaller-volume objectives 46 should be used and the cameras 44 should be arranged at a relatively large spacing with respect to each other. In that way larger surface portions can be detected and digitised all at once, while the detected surface can be further enlarged by deflection of the mirrors 50.

It is also possible for the arrangement of camera 44, objective 46 and mirror 50 shown in FIG. 5 also to be used for the first method described, with only one single optical sensor 12. As a result thereof it would also be possible to enlarge the viewing angle of the optical sensor 12 in order also to detect regions which previously were not visible or in order possibly to save on an additional sensor 12.

The present invention provides a method of contactless monitoring of structural components over a large area, which has been described by means of embodiments by way of example with reference to FIGS. 1 to 5. The invention however is not restricted to the illustrated embodiments, but a large number of additions and modifications are also conceivable. The three-dimensional information can be additionally improved by using more than two sensors, the redundancy of structural condition monitoring sensors could be achieved by using more sensors in order to increase the robustness of the method.

The invention claimed is:

1. A method of monitoring the condition of structural components of an aircraft comprising:
    producing images of the structural component with at least a first camera and a second camera, the first and second cameras being mutually spaced;
    communicating the images to at least one computing unit;
    ascertaining the geometry data of a monitored region of the structural component from the images;

ascertaining geometry deviations of discrete regions of the structural component from the comparison of the ascertained geometry data with a reference geometry data set; and ascertaining changes in shape of the structural component from the geometry deviations by the at least one computing unit, wherein the size of objectives of the first and second cameras and the spacing of the first and second cameras depend on the size of the monitored region of the structural component to be monitored, wherein the first camera looks onto a first external pivotable mirror and the second camera looks onto a second external pivotable mirror, wherein each of the first and second external mirrors is pivoted for continuously scanning a surface of the structural component and for enlarging the viewing angle of the first camera and the second camera.

2. The method according to claim 1, wherein the size of the objectives and the spacing of the first and second cameras depend on a desired level of accuracy.

3. The method according to claim 1, wherein, if a smaller region is being monitored, objectives having a larger volume and a smaller spacing between the first and second cameras are selected, wherein, if a larger region is being monitored, objectives having a smaller volume and a larger spacing between the first and second cameras are selected.

4. The method according to claim 1, wherein the first and second cameras operate in the non-visible wavelength range, in particular in the infrared wavelength range.

5. The method according to claim 1, wherein the ascertained change in shape is classified in terms of severity of damage or stresses on the structural component.

6. The method according to claim 5, wherein measures are triggered, in particular an alarm is given, in dependence on the severity of the damage.

7. An apparatus for monitoring the condition of structural components of an aircraft, comprising:

a first camera for producing images of the structural component, the first camera looking onto a first external pivotable mirror, the first external pivotable mirror configured to pivot to continuously scan a surface of the structural component;

a second camera for producing images of the structural component, the second camera looking onto a second external pivotable mirror, the second external pivotable mirror configured to pivot to continuously scan the surface of the structural component and to enlarge the viewing angle of the first camera and the second camera, respectively, the first and second cameras being mutually spaced; and at least one computing unit, wherein the computing unit is adapted to receive the images, to ascertain the geometry data of a monitored region of the structural component from the images, to ascertain geometry deviations of discrete regions of the structural component from the comparison of the ascertained geometry data with a reference geometry data set, and to ascertain changes in shape of the structural component from the geometry deviations, wherein the size of objectives of the first and second cameras and the spacing of the first and second cameras depend on the size of the monitored region of the structural component to be monitored.

8. An aircraft, in particular a passenger aircraft, comprising an apparatus for monitoring the condition of structural components of the aircraft according to claim 7.

* * * * *